United States Patent [19]

Naitoh

[11] 4,428,545
[45] Jan. 31, 1984

[54] SAFETY BELT SYSTEM HAVING RETRACTOR EQUIPPED WITH MANUAL LOCKING MECHANISM

[75] Inventor: Katsumi Naitoh, Fujisawa, Japan

[73] Assignee: NSK-Warner K.K., Tokyo, Japan

[21] Appl. No.: 252,070

[22] Filed: Apr. 8, 1981

[30] Foreign Application Priority Data

Apr. 16, 1980 [JP] Japan .................... 55-049814

[51] Int. Cl.³ .................. A62B 35/02; B65H 75/48
[52] U.S. Cl. .................. 242/107.4 A; 242/107.4 B; 242/107.4 R
[58] Field of Search .............. 242/107.4 A, 107.4 B, 242/107.4 R, 107.6, 107.7; 280/806; 297/478, 480; 188/82.7, 82.1

[56] References Cited

U.S. PATENT DOCUMENTS

| | | | |
|---|---|---|---|
| 2,553,630 | 5/1951 | Capetta | 188/82.7 |
| 2,578,978 | 12/1951 | Mandolf et al. | 188/82.7 X |
| 3,294,446 | 12/1966 | Fontaine | 242/107.4 R X |
| 3,323,749 | 6/1967 | Karlsson | 242/107.4 A |
| 3,343,763 | 9/1967 | Spouge | 242/107.4 A |
| 3,503,571 | 3/1970 | Martin | 242/107.4 A |
| 4,063,777 | 12/1977 | Takada | 242/107.7 X |
| 4,090,735 | 5/1978 | Czernakowski | 242/107.4 A |

*Primary Examiner*—John M. Jillions
*Attorney, Agent, or Firm*—Cantor and Lessler

[57] ABSTRACT

A manual locking mechanism is provided for the nonlocking or emergency locking retractor used in safety belt systems for vehicle. This manual system may be operable either electrically or mechanically, and is distinguishably colored and placed in a position to which the driver on the seat is easily accessible.

6 Claims, 10 Drawing Figures

SAFETY BELT SYSTEM HAVING RETRACTOR EQUIPPED WITH MANUAL LOCKING MECHANISM

BACKGROUND OF THE INVENTION

The present invention relates to a vehicle safety belt system for vehicle including a belt retractor and a non-locking mechanism or emergency locking mechanism to which a manually operable locking mechansim is added.

The belt retractor forming part of such a safety belt system is disclosed in, for instance, U.S. Pat. No. 3,771,814. The vehicles safety belt system for vehicle ordinarily includes a locking mechanism for preventing the belt from being withdrawn from the retractor when there is a quick change in the velocity of a vehicle due to vibrations, rolling or collisions. For this purpose, a variety of mechanisms have been proposed and, for instance, described in U.S. Pat. Nos. 3,294,446; 3,315,915; 4,090,735; and 4,176,810.

In use, it is sometimes required to hold baggage or infants or children seated on an auxiliary carrier on a front passenger seat with the use of the safety belt. With the prior art non-locking retractor or emergency locking retractor, however, there is a fear that the baggage or infant moves forward, e.g., is thrown against the dashboard of the vehicle in the event of an emergency such as an abrupt vibration or rolling, and crash. Thus, no satisfactory restraint effect of the seat belt is obtained in the event of such emergencies.

SUMMARY OF THE INVENTION

In visew of the disadvantages or deficiencies of the prior art, it is a main object of the present invention to provide a safety belt system including a manually operable locking mechanism capable of being attached to the existing non-locking retractor or emergency locking retractor.

According to the present invention, the manual locking mechanism may be operable either mechanically or electrically.

The manual locking mechanism according to the present invention, which is in most cases operated in a moment, includes an operable portion distinguishably colored and placed in a position to which the driver on the seat is easily accessible.

BRIEF DESCRIPTION OF THE DRAWINGS

Other features and advantages of the present invention will be mentioned in the following description of the drawings, in which:

The present invention is applicable to either the non-locking retractor or the emergency locking retractor. For a better understanding of a preferred embodiment of the present invention applied especially to the existing emergency locking mechanism, the mechanism will generally be explained with reference to FIGS. 1 to 3. FIG. 1 shows a retractor 10 including the emergency locking mechanism of the vehicle sensitive type with the parts separated, and FIG. 2 illustrates a vehicle sensor 30 used therein with the parts disassembled.

Figure 1:
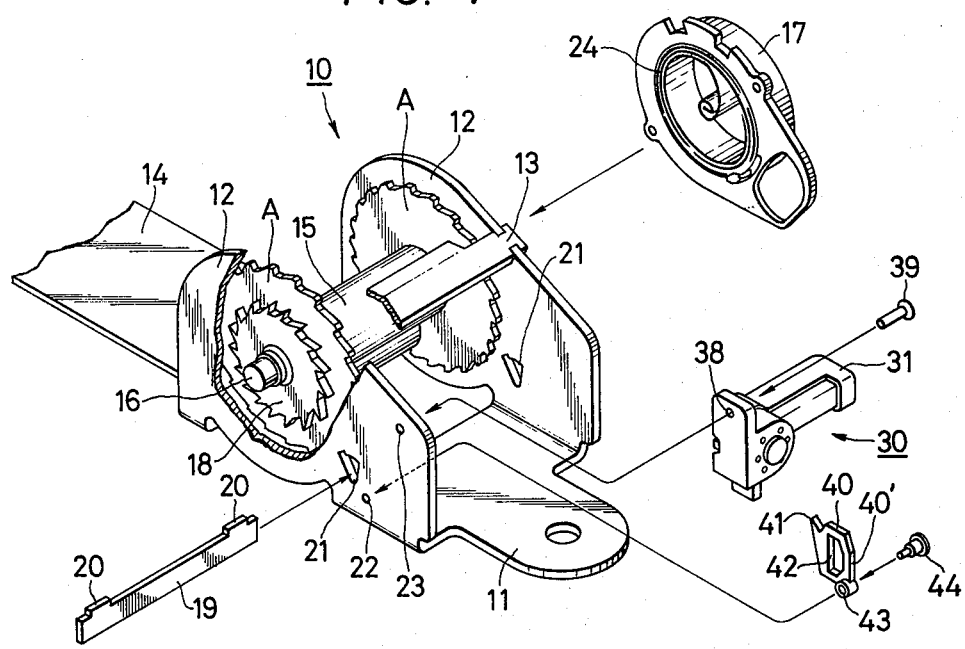
FIG. 1 is an exploded view of a retractor provided with a vehicle sensitive emergency locking mechanism.

A base or bottom plate 11 of the framework of the retractor is bent on both sides at right angles to form side walls 12 and 12, between which a take-up shaft 16 is to be inserted, having its central portion serving as a webbing takeup spool 15. The shaft 16 is integrally provided at both ends with major ratchet wheels A and A so as to form a takeup reel together with the spool. A support frame 13 is provided for the side walls. One side wall 12 is applied on the outside with a spring cover 17 with a built-in take-up spring 24 for invariably biasing the shaft 16 in the webbing take-up direction (the counterclockwise direction in the drawing). An auxiliary ratchet wheel 18 is fixed contiguous to one of the major ratchet wheels attached to the shaft 16. A pawl 19 having engaging tabs 20 and 20 is rockingly inserted through openings 21 in the side walls 12.

A rivet 39 is inserted through a hole 23 in the side wall and an associated hole 38 in the vehicle sensor 30 so as to attach the latter to the former. As will be best understood from the exploded view of FIG. 2, the sensor 30 includes a bottom plate 31 and an inertia sensitive means 32 placed thereon and provided in the top face with a recession 32'. An arm 33 is mounted on the bottom plate 31 by passing a pin 36 through holes 34 therein, and has a projection 35 coming into contact with the recession 32' in the top face of the means 32. Reference numeral 37 stands for a cover. As illustrated, a portion of the cover 37 to be located above the inertia sensitive means is cut out to open the arm 33 to view. In FIG. 2, the arrangement is rotated 90° in the clockwise direction relative to FIG. 1. Consequently, the arm 33 is shown as being pivotable upwardly in the clockwise direction in FIG. 2. It should be noted, however, that the arrangement is mounted on the framework of the vehicle in the illustrated state. On the side of the sensor 30, a rocking lever 40 is mounted on the side wall be inserting a pin 44 through a hole 43 therein and a hole 22 in the side wall. The rocking lever 40 is provided with a lock out tab 41 and in center with an opening 42 which the pawl 19 inserted.

A quick change in the velocity of the vehicle due to a clash or other emergency causes tilting movement of the inertia sensitive means 32, so that a portion of the top face around the recession 32' gives a push to the side 40' of the rocking lever 40 which is, in turn, rotated counterclockwise, thus bringing the tab 41 to mesh with the auxiliary wheel 18. The take-up shaft 16 of the retractor is rotated against the spring 24 in the clockwise direction since the webbing is liable to be rapidly pulled and strongly withdrawn from the retractor as a result of the fact that the occupant is thrown forward, so that the major ratchet wheel A and the auxiliary ratchet wheel 18 contiguous thereto have a tendency to rotate in the clockwise direction. The lever, which has the lock out tab 41 in mesh with the auxiliary ratchet wheel 18, is brought in operable association with the rotation of the wheel 18 is turn the tab 41 counterclockwise. As a consequence, the pawl 19 inserted in the opening 42 in the lever 40 also rotates counterclockwise, and the engaging tabs 20 and 20 mesh with the teeth of the major ratchet wheels A, whereby further rotation thereof is stopped to prevent further rotation of the take-up shaft and hence further withdrawal of the webbing.

Figure 2:
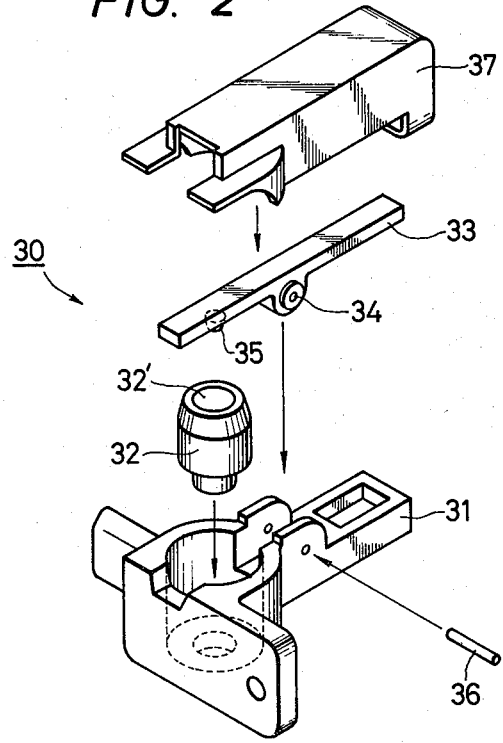
FIG. 2 is an exploded view of the vehicle sensitive mechanism of FIG. 1.
Figure 3:
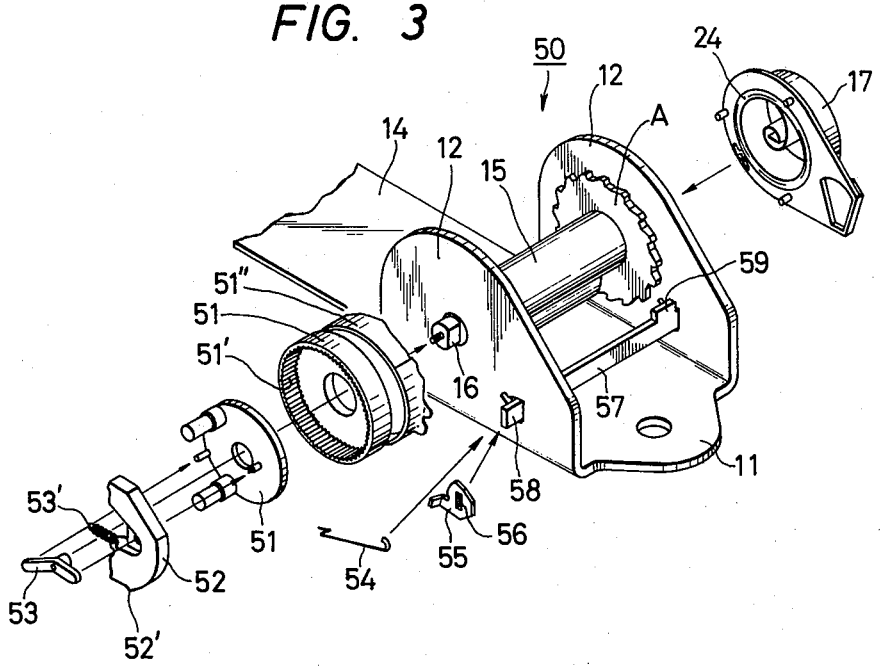
FIG. 3 is an exploded view of a retractor provided with a webbing sensitive emergency locking mechanism.

FIG. 3 is a view similar to FIG. 1, showing a retractor 50 equipped with the emergency locking mechanism of the webbing sensitive type with the parts desassembled. A base or bottom plate 11 of the framework of the retractor 50 is bent on both sides to form side walls 12 and 12, between which a take-up shaft 16 is inserted, having its central portion serving as a webbing take-up spool 15. The shaft 16 is integrally provided at both ends with major ratchet wheels A and A to form a take-up reel together with the spool. The retractor is applied on one side wall with a spring cover 17 with a builtin take-up spring 24 for constantly biasing the shaft 16 in the counterclockwise direction. The retractor is formed on the other side wall with a flange 51 to which a webbing sensitive inertia means 52 is attached through a retainer 53 and a spring 53'. A lever 55 is provided through a latch spring 54, and a pawl 57 is rockingly inserted through the side walls 12 and 12 with its one end 58 fitted into a hole 56 in the lever 55. Normally, the lever 55 is biased clockwise by the latch spring 54, and the pawl 57 has its engaging tab 59 out of engagement with the teeth of the major ratchet wheel A.

A quick change in the velocity of the vehicle due to a crash or other emergency causes the occupant to be thrown forward owing to inertia, resulting in rapid and strong withdrawal of a webbing 14. The shaft 16 then has a tendency to rotate rapidly against the spring 24 is the clockwise direction, with resulting rapid turning of the latch cup 51 integral therewith. However, the webbing sensitive inertia means 52 does not follow such movement due to its inertia, with the result that it rocks and opens outwardly against the spring 53'. Subsequently, the projection 52' of the means 52 meshes with the integral teeth 51' of a latch cup 51 which turns clockwise together with a clutch spring 11 coupled resiliently thereto. As a consequence, the lever 55 rotates counterclockwise against the latch spring 54 to thereby cause counterclockwise rotation of the pawl 57 and hence locking engagement of the tab 59 thereof with the teeth of the major ratchet wheel A.

Reference has been made to the emergency retractors of the vehicle and webbing sensitive types as well known in the art. In what follows, the manual locking mechanism of the present invention, which is designed to be capable of being attached to the retractors, will be explained.

Figure 5:
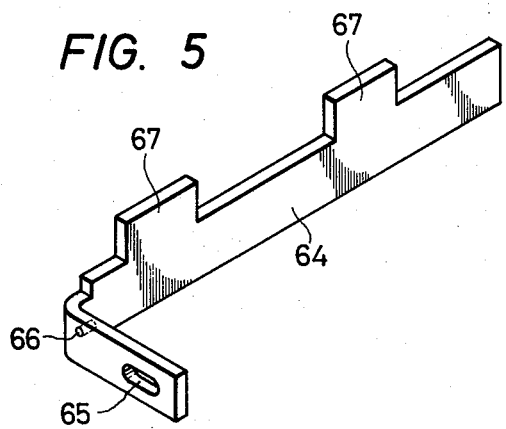
FIG. 5 is an enlarged view of a pawl used in the embodiment of FIG. 4.
Figure 4:
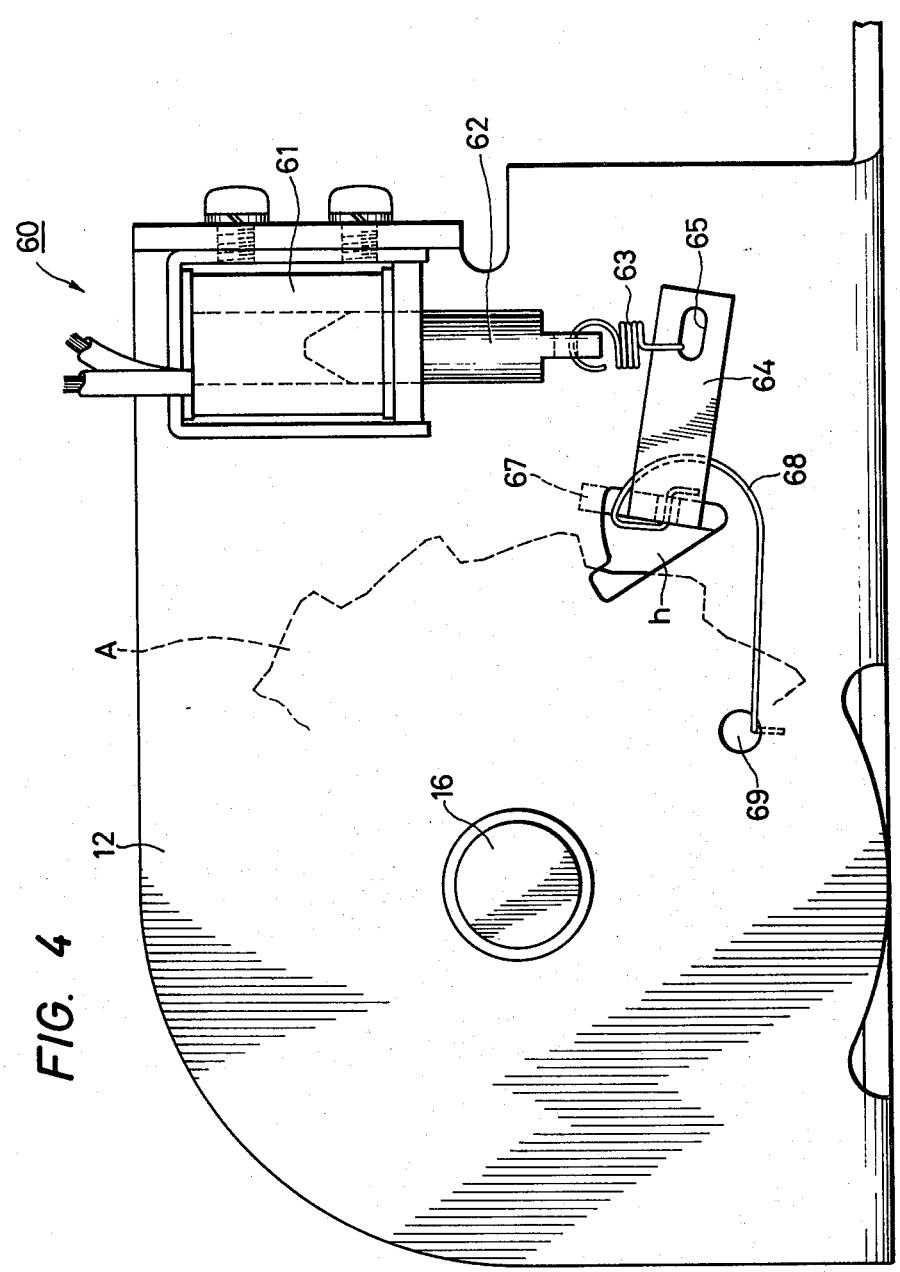
FIG. 4 is a view of one embodiment of the manual locking mechanism of the electrical type according to the present invention.

Referring to FIGS. 4 to 10, particularly to FIG. 4, there is shown one embodiment of the locking mechanism according to the present invention. A manual locking mechanism of the electrical type using an electromagnet, shown generally at 60, includes an electromagnet 61 and a plunger 62 attracted thereby, and also has a pawl 64 attached to the plunger through a tension spring 63. The pawl 64 is inserted in a hole h in the side wall 12 and normally biased clockwise by a latch spring 64 with its engaging tab 67 being out of engagement with the teeth of the ratchet wheel A. FIG. 5 is an enlarged view of the pawl 64 which, as illustrated, is bent at a right angle and has engaging tabs 67, 67 and a slot 66 through which the latch spring is inserted.

Figure 6:
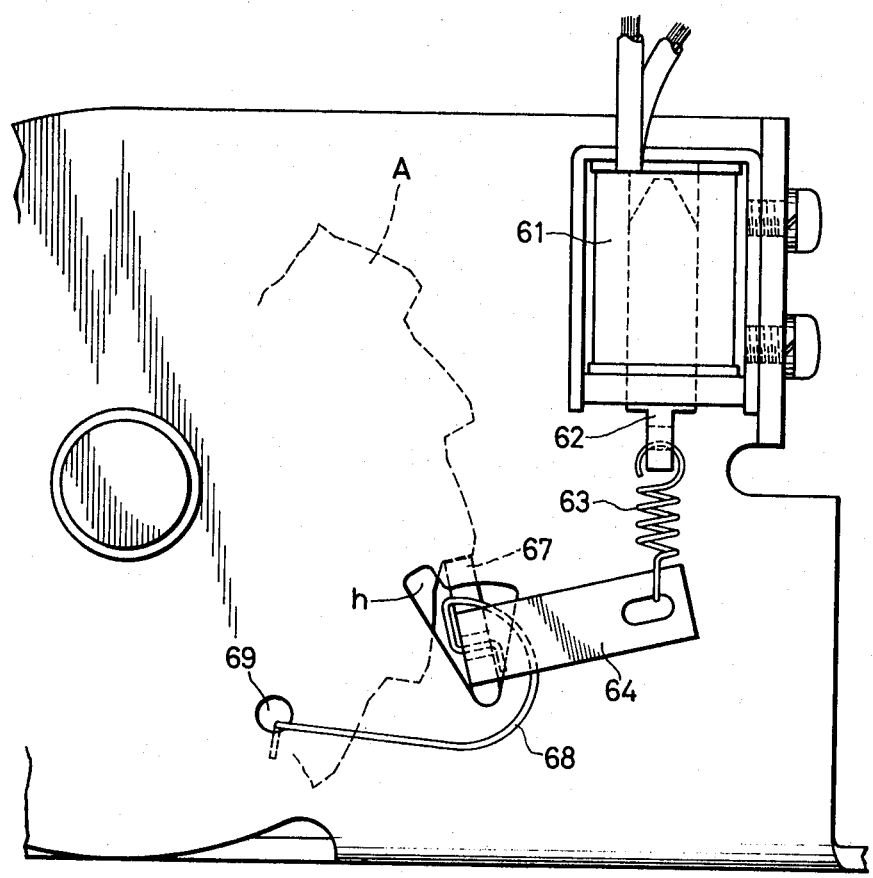
FIG. 6 is a view showing the embodiment of FIG. 4 in its operative position.

Referring to FIG. 6 showing the manual locking mechanism 60 in its operative position, excitation of the electromagnet causes the plunger 62 to be attracted thereto and pawl 64 to be rotated counterclockwise, so that the tabs 67 mesh with the teeth of the ratchet wheels A, thus producing a locking effect.

Figure 7:
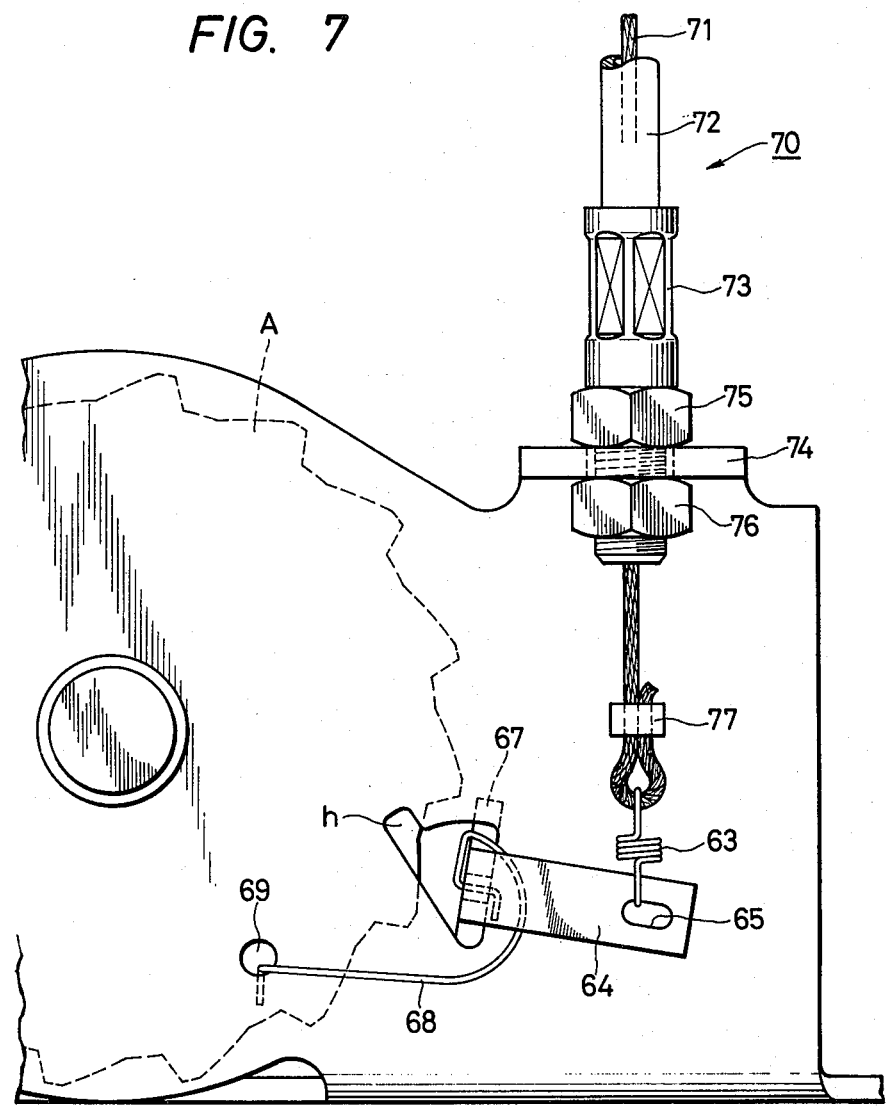
FIG. 7 is a view of one embodiment of the manual locking mechanism of the mechanical type according to the present invention.
Figure 8:
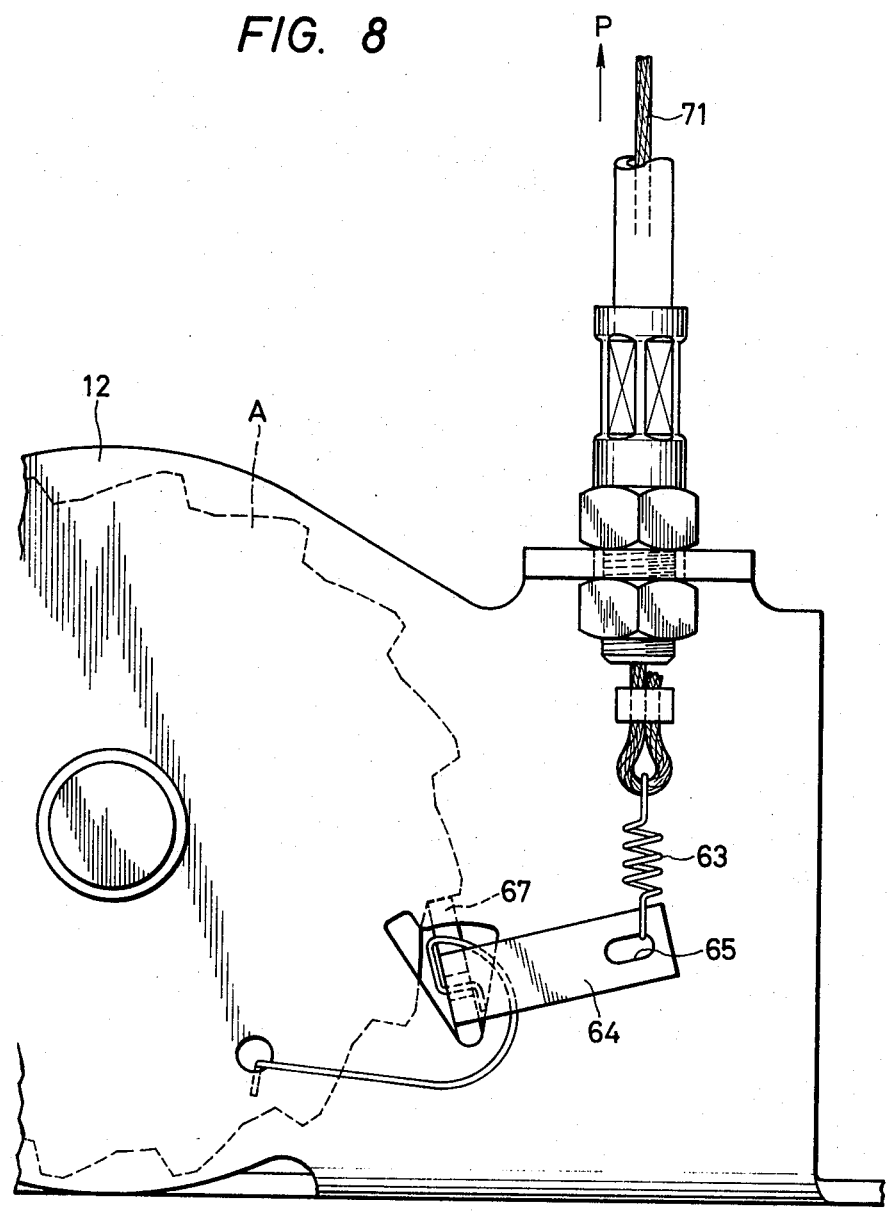
FIG. 8 is a view of one embodiment of the pulling means according to the present invention.

Referring to FIG. 7, there is shown one embodiment of the manual lockikng mechanism which is mechanicaly operated as by pulling a cable. In FIG. 7, like numerals indicate like parts of components used in FIGS. 4 to 6. The driver seat can pull a cable 71 extending through a protective sleeve 72, if required. Following the protective sleeve, there is a cable buckle 73 fixed on the flange 74 of the retractor framework by nuts 75 and 76. Part of the cable 71 passing through the buckle 73 is united into a small loop by a cable clamp 77, said loop being coupled to the tension spring 63 attached to the pawl 64. Turning to FIG. 8 showing this mechanism in its operative position, when the driver on the seat pulls the cable in a direction indicated by an arrow P (as viewed in FIG. 8) as occasion arises, the pawl 64 swings counterclockwise as illustrated, so that the engaging tabs 67 mesh with and are locked by the teeth of the ratchet wheels A. In both FIGS. 6 and 8, between the plunger or cable and the pawl 64 is interposed a spring 63, which serves as a buffer member when the engaging tabs 67 mesh with the teeth of the ratchet wheels A.

Figure 9:
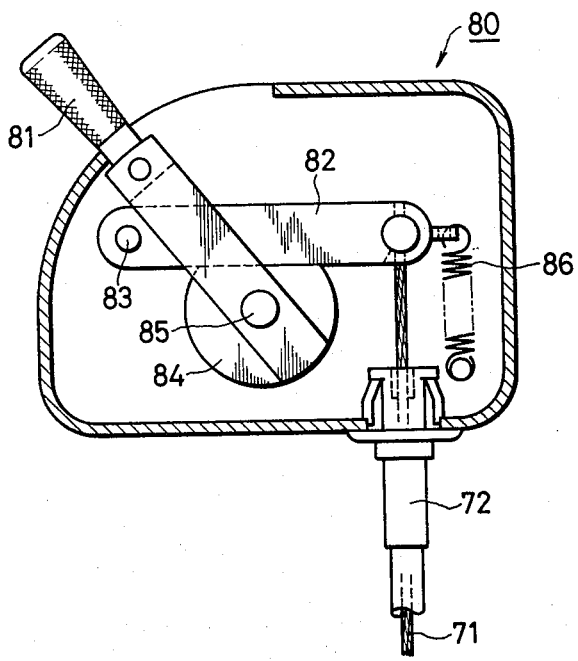
Figure 10:
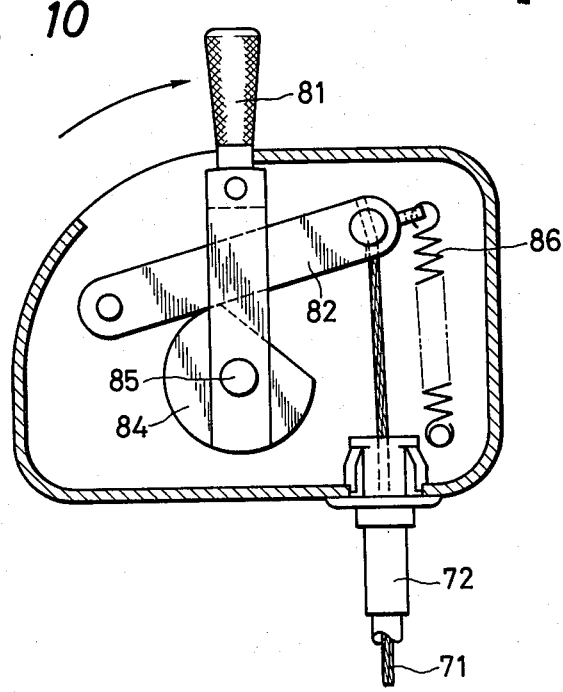
FIG. 10 is a view showing the embodiment of FIG. 9 in its operative position.

FIG. 9 shows one embodiment of the means for pulling the cable 71, which is located in a position near the driver's seat. A lever 81 having an integral cam 84 is pivoted on a point 85. An arm 82 is contiguous to the cam, and pivoted on a point 83 with its one end being provided with the cable 71 and placed under tension by a tension spring 86. In operation, the lever 81 pivots clockwise as illustrated in FIG. 10. The cam 84 is then rotated to cause pivotal movement of the lever 82 in the counterclockwise direction, thus pulling the cable 71 to a state as shown in FIG. 8.

While the present invention has been described only in connection with the manual locking mechanism rather than the emergency locking mechanism, it will be understood that the manual locking mechanism according to present invention is applicable as such to the non-locking retractor, whereas, in the emergency locking mechanism, it is added to the emergency locking mechanism for use.

As an example, the manual locking mechanism as shown in FIG. 4 or 7 may be attached to the vehicle sensitive retractor constructed as illustrated in FIG. 1 or 2 by replacing the pawl 19 by the pawl 64 shown in FIG. 5. This is also true of the case wherein the manual locking mechanism is attached to the webbing sensitive retractor constructed as shown in FIG. 3.

In a similar way, the manual locking mechanism according to the present invention is applicable to a retractor of the dual type, i.e., the vehicle webbing sensitive type.

As mentioned in the foregoing, the present invention provides the manually operable locking mechanism which is a separate attachment applicable to the vehicle non-locking and emergency locking retractors for vehicle. This manual mechanism is used in the case of holding baggage or an infant or children seated on an auxiliary chair placed thereon. In this case, the baggage or children is held by a safety belt system to which the manual locking mechanism of the present invention is attached. In the event of emergencies such as operate the mechanism in a moment, to thereby prevent the baggage or children from being thrown in front of the seat.

Since the manual locking mechanism according to the present invention is distinguishably colored and placed in a position to which the driver on the seat is easily accessible, he can operate it in the event of emergencies or whenever occasion requires, so as to assure prevention of further withdrawal of the webbing.

What is claimed is:

1. A webbing retractor arrangement including a manual locking mechanism comprising:
   retractor means biased in the webbing-retracting direction;
   locking means which can be placed in engaging and non-engaging positions for permitting said retractor means to be prevented from rotating in the webbing-withdrawal direction and to rotate in the webbing withdrawal direction;
   mechanically operable operating means for manually operating said locking means so as to bring it to either one of said positions, said operating means including a wire by which said locking means is brought to either one of said positions;
   means for limiting the amount of movement of said wire to a given value or less;
   said means for limiting the amount of movement comprising an arm to which one end of said wire is attached, a manually operable lever which is integrated with a cam engageable with said arm, said cam having an arc portion and a chord portion, said arm being normally engaged with the chord of the cam and, when operated, being engaged with the arc portion of the cam, whereby said wire is not further moved even when said lever is thereafter rotated; and
   buffer means interposed between said locking means and said operating means.

2. The webbing retractor arrangement as recited in claim 1, in which said buffer means is a coil spring disposed between said locking means and said wire.

3. A webbing retractor arrangement as recited in claim 1, further comprising:
   sensor means for sensing a change in the velocity of the vehicle, depending upon which said locking means is brought to either one of said positions; and
   operating means for manually operating said locking means regardless of said sensor means.

4. The webbing retractor arrangement as recited in claim 3, in which said buffer means is a coil spring disposed between said locking means and said wire.

5. A webbing retractor arrangement as recited in claim 1, further comprising:
   inertia means mounted on said retractor means in such manner that it usually rotates together with said retractor means and adapted to move to a position relative to said retractor means when a change in the webbing-withdrawal speed exceeds a given value; and
   transmitting means for transmitting the rotation of said retractor means to said locking means so as to bring said locking means to said engaging position when said inertia means is located in said position.

6. The webbing retractor arrangement as recited in claim 5, in which said buffer means is a coil spring disposed between said locking means and said wire.

* * * * *